United States Patent [19]

Hammermann

[11] Patent Number: 5,402,015
[45] Date of Patent: Mar. 28, 1995

[54] CABLE CONNECTION BETWEEN A PC AND A SEWING MACHINE

[75] Inventor: Joachim Hammermann, Stutensee, Germany

[73] Assignee: G. M. Pfaff Aktiengesellschaft, Kaiserslautern, Germany

[21] Appl. No.: 966,942

[22] Filed: Oct. 27, 1992

[30] Foreign Application Priority Data

Oct. 28, 1991 [DE] Germany .......... 41 35 471.0

[51] Int. Cl.⁶ ................................ H03K 19/0175
[52] U.S. Cl. ....................................... 326/75
[58] Field of Search ........................ 307/475, 454

[56] References Cited

U.S. PATENT DOCUMENTS

| | | | |
|---|---|---|---|
| 4,996,453 | 2/1991 | Zanders et al. | 307/475 |
| 5,047,663 | 9/1991 | Lee et al. | 307/475 |
| 5,260,612 | 11/1993 | Lehmann et al. | 307/475 |

FOREIGN PATENT DOCUMENTS 8436211  5/1985  Germany .......... H03K 13/256

OTHER PUBLICATIONS

Sharp Organizer Link 02-791A Operation Manual, pp. 1-4, 1989, Sharp Electronics Corporation.
Mektron GmbH, Elektronik, May 29, 1987, p. 179.

*Primary Examiner*—Edward P. Westin
*Assistant Examiner*—Richard Roseen
*Attorney, Agent, or Firm*—McGlew and Tuttle

[57] ABSTRACT

A cable connection between a PC and a sewing machine for transmitting data in the form of different voltage levels, wherein the cable connection for connection to the PC has an RS 232 C port and the sewing machine has a TTL port. A level converter is integrated in the cable connection, preferably in the connection jack to the RS 232 C port. The level converter has a switching transistor controllable by the sending pole of the TTL port and a switching transistor controllable by the sending pole of the 232 port for connecting the corresponding receiving pole to a voltage potential which it is able to receive.

6 Claims, 2 Drawing Sheets

CABLE CONNECTION BETWEEN A PC AND A SEWING MACHINE

FIELD OF THE INVENTION

The present invention pertains to a cable connection between a personal computer (PC) and a sewing machine for transmitting data consisting of various voltage levels, wherein the cable connection has an RS 232 C port for connection to the PC, and the sewing machine has a TFL (transistor transistor logic) port.

BACKGROUND OF THE INVENTION

Electric cable connections of this type between a PC and a sewing machine are generally known. They serve to enable data transmission between the PC and the sewing machine. However, data transmission is guaranteed only if a suitable voltage level is applied to the device receiving the data.

If the PC has an RS 232 C port, it is designed for a voltage level of −15 V to +15 V. Since the sewing machine used is equipped with a TTL (transistor transistor logic) logical unit, and thus it carries a voltage level of 0 to +5 V at its port, an additional port on the sewing machine, which would have to be designed for a voltage level of −15 V to +15 V, would be required for using a standard cable connection between the two devices. However, this requires an additional expense in connection with the manufacture of the sewing machine. Since such a PC port is used only in a small percentage of the sewing machines sold, such an increase in the cost of manufacture is not acceptable.

SUMMARY AND OBJECTS OF THE INVENTION

The primary object of the present invention is to provide a cable connection between a personal computer (PC) and a sewing machine for transmitting data consisting of various voltage levels, wherein the cable connection has an RS 232 C port for connection to the PC, and the sewing machine has a TTL (transistor transistor logic) port, which permits a simple connection of the two devices to be used at low expense, without the sewing machine having to have a level adjustment means of its own.

According to the invention, a cable connection between a PC and a sewing machine for transmitting data at various voltage levels is provided wherein the cable connection has an RS 232 C port for connection to the PC and a TTL for connection to the sewing machines. Level adjustment means is provided in the cable connection for adjusting the connection points of the PC and the sewing machine. The connection points have different sending and receiving levels which are compensated for by the adjustment means.

The cable connection can be connected via a jack to the connector of the RS 232 C port, which connection is present on the PC. The adjustment means includes a level converter which is provided as a circuit built on a printed circuit board built into the jack, part of the RS 232 C port jack. A level converter has a switching transistor which can be controlled by the sending pole of the TTL port and a switching transistor which can be controlled by the sending pole of the RS 232 C port. The switching transistors bring about switching of the corresponding receiving pole to a voltage potential which can be received by the corresponding receiving pole. Of the switching transistors mentioned, at least one is a PNP switching transistor whose emitter is connected to the power supply unit of the TTL port of the sewing machine. The base of the PNP switching transistor is connected to the sending pole of the TTL port and the collector is connected to the both the receiving pole of the RS 232 C port and, via a resistor and a rectifier, to the sending pole of the RS 232 C port. The other switching transistor is preferably a NPN switching transistor whose emitter is connected to the ground of both the RS 232 C port and the TTL port. The base of the NPN switching transistor is connected to the sending pole of the RS 232 C port and the collector is connected to both the receiving pole of the TTL port and, via a resistor, to the power supply unit of the TTL port. These features of the level converter circuit make it possible to obtain a circuit of simple design, consisting of only a few components.

The various features of novelty which characterize the invention are pointed out with particularity in tile claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
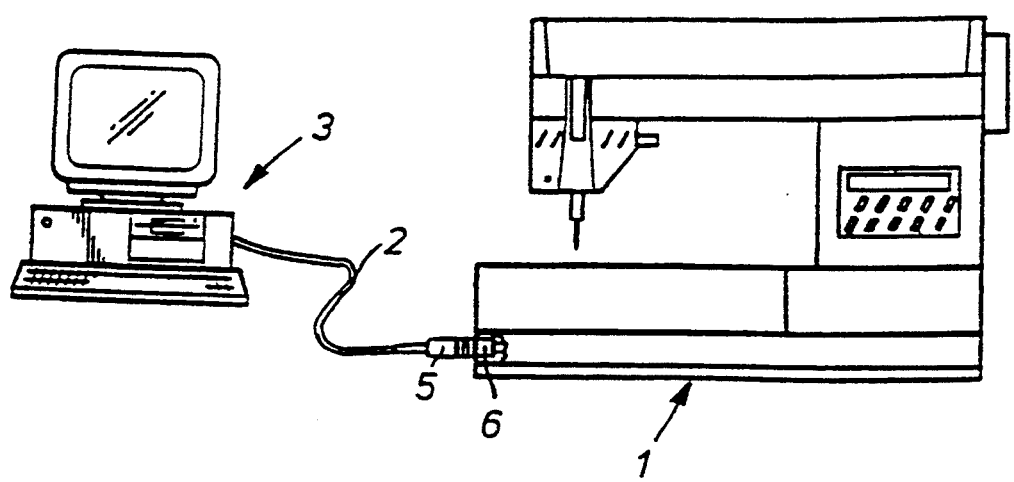
FIG. 1 is a schematic representation of a sewing machine with a Personal Computer connected via a cable connection.
Figure 2:
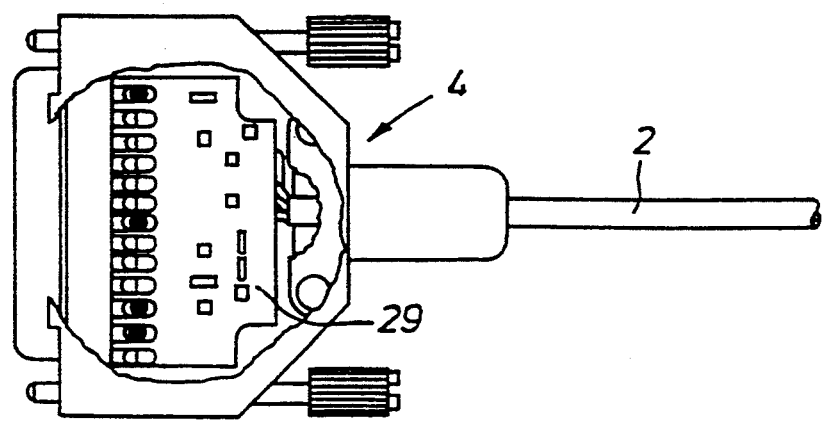
FIG. 2 is a partially cutaway representation of the jack of the cable connection.
Figure 3:
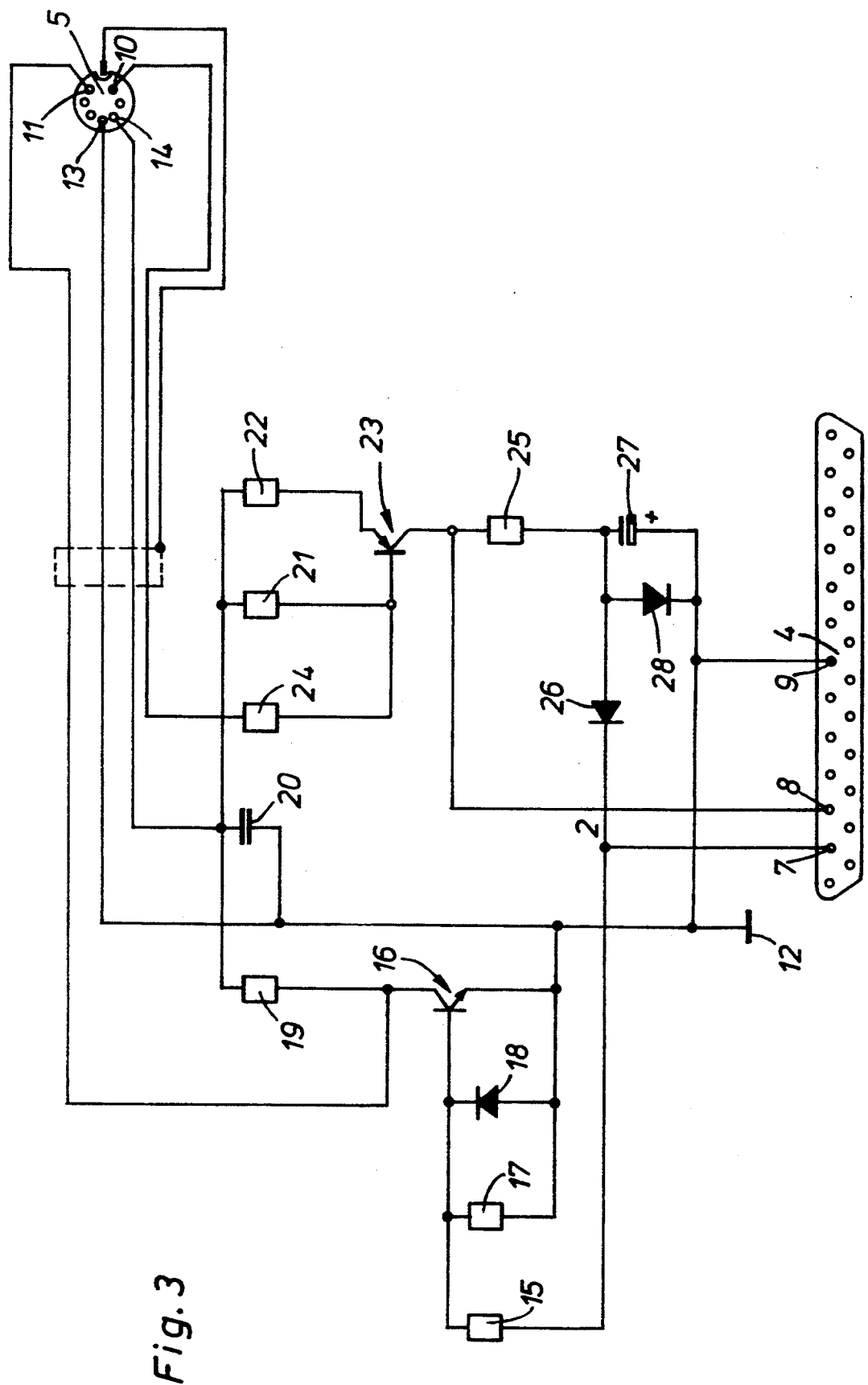
FIG. 3 is a circuit diagram of tile level converter contained in the cable connection.

As is shown in FIG. 1, a sewing machine 1 is connected to a Personal Computer (PC) 3 via a cable connection 2. The cable connection 2 serves to transmit data from the PC 3 to the sewing machine 1 and vice versa. The cable connection 2 is connected, at one end, to a 25-pole connector, not shown, of the PC 3 via a 25-pole jack 4. This port is a prior-art port designated by RS 232 C (the RS 232 C standard). The other end of the cable connection is connected via a 7-pole connector 5 to a 7-pole jack 6 of the sewing machine. While the PC 3 carries a voltage level that can be varied between −15 V and +15 V on its port, the port of the sewing machine has TTL level in this case because of the logical unit used in the sewing machine control, i.e., a voltage level that can be varied between 0 V and +5 V is present on the jack 6.

The two devices (the PC 3 and the sewing machine 1) cannot consequently be connected by a simple transmission connection. It is necessary to first adjust the voltage level of the PC 3 to the voltage level of the sewing machine 1.

To adjust the levels of +3 V to +15 V for the logical "0" and of −3 V to −15 V for the logical "1" in the PC 3, and to adjust the TTL levels of +0 V to 0.8 V for the logical "0" and of +2.4 V to 5 V for the logical "1," which latter levels are used in the sewing machine, a level converter is integrated within the jack 4 of the cable connection 2.

The jack 4 of the RS 232 C port has a pin 7 connected to the sending pole of the PC 3, a pin 8 connected to the receiving pole of the PC 3, and a pin 9 connected to ground 12.

The connector 5 of the TTL port is provided with a pin 10 connected to the sending pole of the sewing machine 1, with a pin 11 connected to the receiving pole of the sewing machine 1, with a pin 13 connected to ground 12, and with a pin 14, which is connected to the power supply unit (+5 V) of the TTL unit of the sewing machine 1.

The pin 7 of the jack 4 is connected to the base of an NPN-type switching transistor 16 via a resistor 15. Between the base of the switching transistor 16 and the resistor 15, a parallel connection of a resistor 17 and a diode 18, which are connected, together with the emitter of the switching transistor 16, to the ground 12, is connected.

The collector of the switching transistor 16 is connected directly to the pin 11 of the connector 5 and via a resistor 19 to the pin 14. The pin 14 is also connected—via a capacitor 20, to the ground 12, to the base of a PNP-type switching transistor 23 via a resistor 21, and to the emitter of the PNP-type switching transistor 23 via a resistor 22. Via a resistor 24, the base of the switching transistor 23 is connected to the pin 10 of the connector 5, whose the pin 13 is connected to the ground 12.

The collector of the switching transistor 23 is connected directly to the pin 8 of the jack 4 and, via a resistor 25 and a diode 26, to the pin 7 of the jack 4, wherein the cathode of the diode 26 is connected to the pin 7. The connection between the anode of the diode 26 and the resistor 25 is also connected to the ground 12 via a parallel connection of a capacitor 27 and another diode 28. The ground 12 serves as a level reference point in the circuit.

The circuit is built up on a printed circuit board 29 in a minimal space, so that it can be accommodated by the jack 4. Consequently, only four power lines are necessary for transmitting data, even though not only a level adjustment in terms of the voltage level, but also reversal of the voltage are necessary.

The circuit operates as follows:

On the pins 10 and 11 of the connector 5 connected to the TTL unit of the sewing machine 1, the logical state "0" corresponds to the level voltage of 0 V . . . 0.8 V, and the state "1" corresponds to the level voltage of +2.4 V . . . +5 V.

In contrast, the logical state "0" on the pins 7 and 8 of the jack 4 of the RS 232 C port of the PC 3 corresponds to the level voltage of +3 V . . . +15 V, and the state "1" corresponds to the level voltage of −3 V . . . −15 V.

As soon as the PC 3 stops transmitting, its output on the pin 7 assumes the level voltage of logical "1." In this case, this corresponds approximately to a level voltage of ca. −12 V. The diodes 26 and 28 are used to obtain this negative voltage from the pin 7 during the transmission pause of the PC 3. The negative voltage is now buffered in the capacitor 27. The resistor 19 serves to limit the current of the d.c. voltage present on the pin 14.

The data transmission between the PC 3 and the sewing machine 1 takes place serially in the known manner, i.e., beginning with a start bit, followed by eight data bits, followed by a stop bit. The start bit is always a logical "0."

If a logical "0," e.g., the start bit, is present on the pin 10 of the connector 5, the switching transistor 23 becomes conductive, so that the positive voltage of +5 V on the pin 14 is present on the pin 8 of the jack 4 via the emitter-collection section of the transistor 23. This means that the PC 3 is receiving the state "0."

As soon as the pin 10 of the connector 5 is switched to logical "1," e.g., during a stop bit, the switching transistor 23 will block, so that the negative voltage present on the capacitor 27 is sent to the pin 8 via the resistor 25, so that the latter pin 8 will thus be switched over to the state "1."

During transmission operation of the PC 3 to the sewing machine 1, a level voltage, which is greater than +3 V, is sent, when the state "0" appears, from the pin 7 to the base of the switching transistor 16 via the resistor 15. The collector-emitter section of the transistor 16 is thus conductive, and the pin 11 of the connector 5 is connected to the ground 12, i.e., it is switched to "0" level, via the transistor 16.

As soon as level "1," i.e., a voltage lower than −3 V, is applied to the pin 7, the transistor will block, as a result of which the voltage of +5 V on the pin 14 of the connector 5 is sent, via the resistor 19, to the pin 11, which will then assume the potential corresponding to logical "1."

The data transmitted by the sewing machine 1 at various positive voltage levels are thus converted into corresponding positive and negative voltage levels, which the PC 3 is able to receive. Likewise, the positive and negative voltage levels sent by the PC 3 are converted into corresponding varying positive voltage levels, which the TTL unit of the sewing machine 1 is able to receive.

While a specific embodiment of the invention has been shown and described in detail to illustrate the application of the principles of the invention, it will be understood that the invention may be embodied otherwise without departing from such principles.

What is claimed is:

1. A cable for connection between a personal computer and a sewing machine for transmitting data in the form of different voltage levels, comprising:

a personal computer cable connection having an RS 232 C connector for connection to a sending pole, a receiving pole and a ground of a personal computer RS 232 C port;

a sewing machine connection having a TTL port connector for connection with a sending pole, a receiving pole, ground and a power pin of a sewing machine TTL port;

a level converter integrated in said cable, said level converter including first switching transistor activated by said sending pole of said TTL port for switching a connection of said receiving pole of said RS232 connector between said TTL power pin and a voltage from a capacitor charged by said RS 232 C sending pole and, said level converter also including a second switching transistor controlled by said RS 232 C sending pole for switching a connection of said TTL receiving pole between ground and said TTL power pin.

2. A cable connection according to claim 1, wherein:
said first switching means includes a PNP switching transistor having an emitter connected to said power pin of said TTL port of the sewing machine, having a base connected to said sending pole of the TTL port, and having a collector connected to both said receiving pole of said RS 232 C port and, via a resistor and a diode, to said sending pole of said RS 232 C port, said diode conducting in the direction of said sending pole;

said second switching means includes an NPN switching transistor having an emitter connected to ground of both said RS 232 C port and said TTL port, having a base connected to said sending pole of said RS 232 C port and having a collector connected to both said receiving pole of said TTL port and, via a resistor, to said power pin of said TTL port.

3. A cable connection according to claim 1, wherein:
said first switching means connects and disconnects a conductive path between said power pin of said TTL port and said receiving pole of said RS 232 C port;
said capacitor having a first connection point connected to said receiving pole of said RS 232 C port via a resistor and having a second connection point to ground.

4. A cable connection according to claim 1, wherein:
said second switching means connects and disconnects a conductive path between said receiving pole of said TTL port and said ground;
said power pin of said TTL port being connected to receiving pole of said TTL port via a resistor.

5. A cable for connection between a personal computer and a sewing machine for transmitting data in the form of different voltage levels, comprising:
an RS 232 C connector for connection to a sending pole, a receiving pole and a ground of a personal computer RS 232 C port;
a sewing machine connection having a TTL port connector for connection with a sending pole, a receiving pole, ground and a power pin of a sewing machine TTL port;
a level converter integrated in said cable, said level converter including first switching means activated by said sending pole of said TTL port for switching a connection of said receiving pole of said RS 232 C port between said TTL power pin and a voltage from a capacitor charged by said RS 232 C sending pole, and said level converter also including a second switching means controlled by said RS 232 C sending pole for switching a connection of said TTL receiving pole between ground and said TTL power pin, said first switching means is a PNP switching transistor, a collector of said PNP switching transistor is connected to said receiving pole of said RS 232 C port and is connected to said sending pole of said RS 232 C port via a resistor and a diode, said diode conducting in a direction of said sending pole, said capacitor having a first connection point between said resistor and said diode and having a second connection point to ground.

6. A cable for connection between a personal computer and a sewing machine for transmitting data in the form of different voltage levels, comprising:
an RS 232 C connector for connection to a sending pole, a receiving pole and a ground of a personal computer RS 232 C port;
a sewing machine connection having a TTL port connector for connection with a sending pole, a receiving pole, ground and a power pin of a sewing machine TTL port;
a level converter integrated in said cable, said level converter including first switching means activated by said sending pole of said TTL port for switching a connection of said receiving pole of said RS 232 C port between said TTL power pin and a voltage from a capacitor charged by said RS 232 C sending pole, and said level converter also including a second switching means controlled by said RS 232 C sending pole for switching a connection of said TTL receiving pole between ground and said TTL power pin, said second switching means is a NPN switching transistor with an emitter connected to ground of each of said RS 232 C port and said TTL port and has a base connected to said sending pole of said RS 232 C port and having a collector connected to both said receiving pole of said TTL port and, via a resistor, to a power supply unit of said TTL port.

* * * * *